US006697008B1

(12) United States Patent
Sternowski

(10) Patent No.: US 6,697,008 B1
(45) Date of Patent: Feb. 24, 2004

(54) DISTRIBUTED ELECTRONIC WARFARE SYSTEM

(75) Inventor: Robert H. Sternowski, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/376,585

(22) Filed: Feb. 28, 2003

(51) Int. Cl.[7] .............................. G01S 7/26; G01S 7/42; H04K 3/00; H04B 7/85
(52) U.S. Cl. ...................... 342/14; 342/15; 342/353; 455/1
(58) Field of Search ........................ 342/13, 14, 15, 342/353, 357.01, 357.17; 455/1

(56) References Cited

U.S. PATENT DOCUMENTS

| | | | | |
|---|---|---|---|---|
| 3,852,747 A | * | 12/1974 | Morand | 342/15 |
| 4,307,400 A | * | 12/1981 | Miley | 342/14 |
| 5,378,155 A | * | 1/1995 | Eldridge | 434/11 |
| 6,147,646 A | * | 11/2000 | Arneson et al. | 342/417 |
| 6,166,679 A | * | 12/2000 | Lemelson et al. | 342/45 |
| 6,549,162 B1 | * | 4/2003 | Gage et al. | 342/353 |
| 6,563,457 B2 | * | 5/2003 | Chang et al. | 342/357.01 |

* cited by examiner

*Primary Examiner*—Thomas H. Tarcza
*Assistant Examiner*—Brian Andrea
(74) *Attorney, Agent, or Firm*—Nathan O. Jensen; Kyle Eppele

(57) ABSTRACT

A distributed electronic warfare system includes a central control site for controlling and receiving data from the system and utilizes a satellite communications system for communications within the system. Electronic warfare pods are attached to variety of aircraft. The electronic warfare pods listen to signals from targets and jam the targets under control of the central control site. The pods supply the data to the central control site. The pods have antennas for radiating jamming signals to the targets and receiving signals from the targets. Transmitters in the pods generate jamming signals and receivers receive the signals from the targets. A signal processor processes the received signals from the targets. The pods may be used for search and collection, geolocation, and electronic attack under control of the central control site.

20 Claims, 4 Drawing Sheets

DISTRIBUTED ELECTRONIC WARFARE SYSTEM

BACKGROUND OF THE INVENTION

This invention relates to electronic warfare systems and specifically to a distributed electronic warfare system.

The DoD currently has very limited radio tactical intercept, geolocation, and electronic attack assets. National space borne assets are of limited value in hunting and closely locating targets in a confined geographic area such as Afghanistan. Assets high in orbit have a very narrow angle within which to identify targets, although they likely can hear them well. Attacking targets electronically from orbit is similarly difficult because of the path loss due to distance, complicated by the collateral damage from the wide orbital field of coverage. These issues are not unlike those arguments of imagery from orbit versus tactical low altitude.

Tactical electronic warfare assets today consist of the US Navy EA-6B Prowler fleet and a relative handful of special purpose aircraft such as the EC-130 Compass Call, Senior Scout, and Rivet Joint. The dedicated EW mission EF-111 fleet was retired years ago, ceding the major tactical EW support mission to the US Navy. Today the EA-6B is aging and in need of replacement. A valid question is whether the US Navy with its unique basing and support requirements is best suited to provide DoD tactical EW support for ground combat, especially far from the oceans, given that the Air Force is already providing other military assets and support in theater. A unique tactical EW aircraft is very expensive to develop, field and support.

Electronic warfare pods such as the AN/ALQ-167(V) and the self protect electronic countermeasures (ECM) pod AN/ALQ-184 are used on such aircraft as the F-16, A-10, F4, F-111, F-15, A-7, C-130, and EA-6B. These pods are typically used for tactical self-protection and standoff escort jamming and interfacing to ESM equipment. These electronic warfare pods do not provide the full tactical electronic warfare capabilities of a tactical EW aircraft such as radio intercept, geolocation, and electronic attack.

What is needed from tactical, strategic, and budgetary standpoints is an EW capability that can be fielded and operated as a transparent, standalone system on any random mix of aircraft and sorties in a theater of interest.

SUMMARY OF THE INVENTION

A distributed electronic warfare system is disclosed. The distributed electronic warfare system comprises a central control site for controlling the system and receiving data from the system. Electronic warfare pods are attached to aircraft for listening to targets and jamming the targets under control of the central control site and for supplying the data to the central control site.

A satellite communications system is utilized for communications between the electronic warfare pods and the central control site. The satellite communications system comprises a satellite communications network with a plurality of satellites, a ground network that supports and controls the satellite communications network, gateways for communicating between the satellites and a telephone network, and satellite system transceivers installed in the electronic warfare pods for communicating with the control site over the satellite communications network.

The electronic warfare pods further comprise antennas for radiating jamming signals to the targets and receiving signals from the targets, transmitters for generating the jamming signals, receivers for receiving the signals from the targets; and a signal processor for processing the received signals from the targets.

The electronic warfare pods perform search and collection of signals from targets using the plurality of receivers and the antennas on the pods. The receivers instantaneously span a portion of a band. The signal processor is connected to the receivers for performing a fast Fourier transform that is statistically blended into a search database to detect new energy. The presence of new energy is reported to the central control site via the satellite communications system.

The electronic warfare system may be programmed to search specified channels and the receiver outputs are applied in parallel to a delay line. The delay line output is compared to a current output of the specified channel to detect a new target signal.

Each pod may be programmed by the central control site with search and collection instructions via the satellite communications system. Each pod may be programmed independently or to operate in groups where all pods in the group are programmed identically and execute their commands in GPS time synchronization.

Geolocation of targets is determined by time difference of arrival of signals at a number of pods simultaneously. The geolocation is performed by transmitting from each pod in the group a precise GPS time-stamped sample file with a GPS location of each aircraft to the central control site. A correlation program at the control site determines the target signal geolocation from the time difference of arrival of the signals at each of the dispersed pods.

The pods may perform electronic attack by transmitting a radio signal using the transmitters and antennas to disrupt, deny or deceive an enemy target. The radio signal is transmitted on a selected frequency with a selected modulation under command of the central control site or a control site-initiated autonomous reactive jamming mode. Positive command and control of the electronic warfare system is obtained by transmitting a deadman command via the satellite link and with carrier lock of the satellite link. If the deadman command is missed or the satellite downlink signal is lost, the electronic attack is disabled and operation is resumed when the downlink signal and deadman command are reestablished. The jamming of the target may be reactive, blind, or barrage jamming. Modulations are from a preprogrammed waveform library downloaded via the satellite communications system or played back from a prior pod recording of the target. Deception of a target is typically achieved by playing back a selected digital file from the same target.

It is an objective of the present invention to provide a distributed electronic warfare system that can be fielded and operated as a transparent, standalone system on any random mix of aircraft and sorties in a theater of interest.

It is an objective of the present invention to provide an alternate means of implementing a tactical distributed electronic warfare system without the need for dedicated aircraft.

It is an advantage of the present invention to use a standard missile body as an electronic warfare pod.

It is an advantage of the present invention to perform search and collection, geolocation, and electronic attack from an electronic warfare pod.

It is an advantage of the present invention to utilize a satellite communications system to provide world-wide coverage of the distributed electronic warfare system.

It is a feature of the present invention to be able to mass more jamming power on a target than is possible from a single jammer where the target realizes the vector sum of all incident power from all jamming sources.

It is a feature of the present invention that an electronic warfare pod does not require control, input/output, or interactions with an aircraft upon which the pod is mounted.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
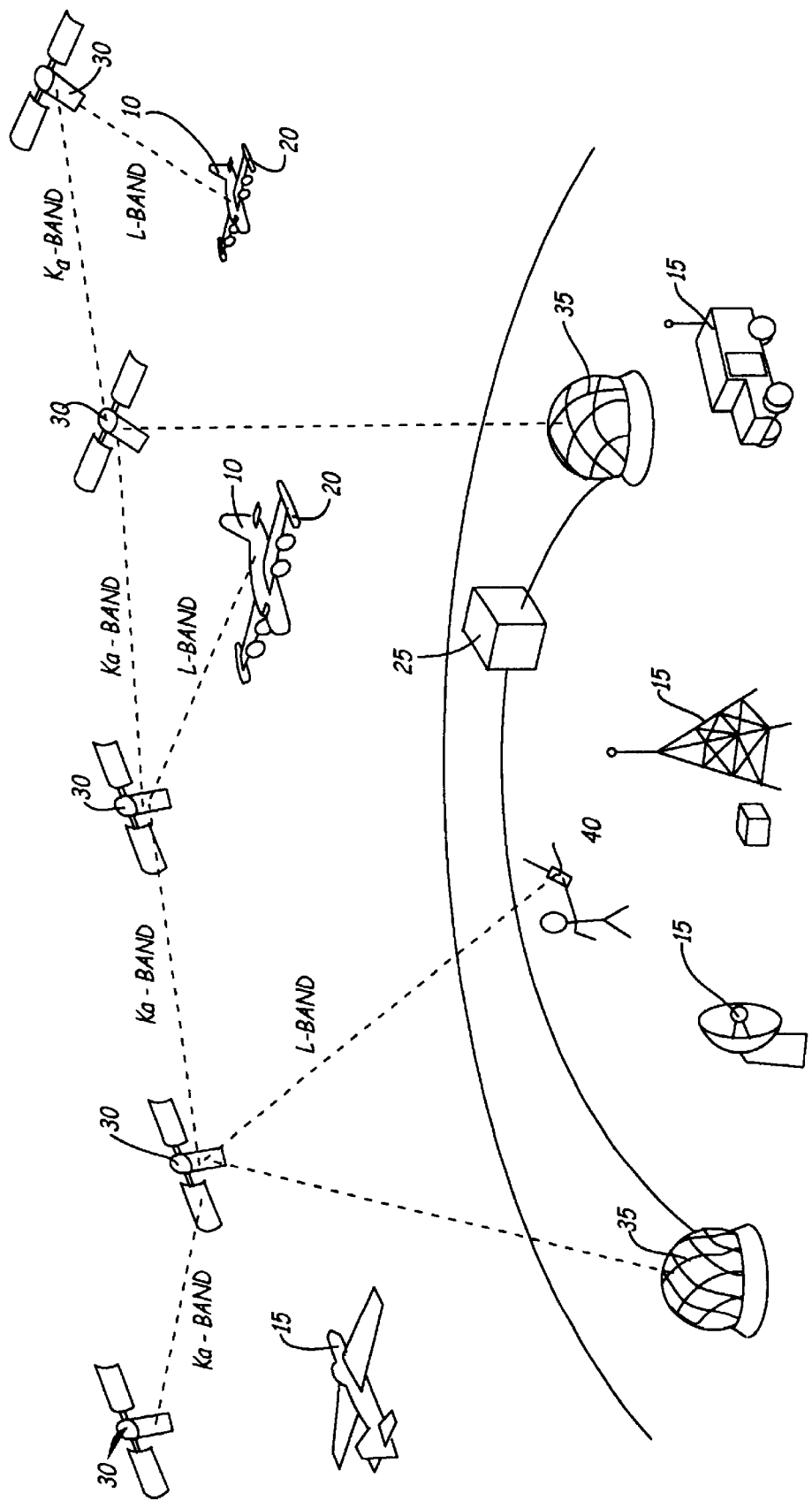
FIG. 1 is a diagram showing the distributed electronic warfare system of the present invention and its relationship with various components therein.

A distributed electronic warfare system of the present invention includes pods 20 mounted to aircraft 10 and networked together via a satellite communications system such as the IRIDIUM system in such a way that all control, fusion, tasking, and reception of target 15 data is handled from a central control site 25 located anywhere in the world and is shown in FIG. 1. The distributed electronic warfare system of the present invention provides a capability to listen and to jam targets 15 by the sum of the many small distributed pods 20 mounted on the aircraft 10 in-theater as shown in FIG. 1. The worldwide IRIDIUM satellite telecommunications network for which the US Government has an unlimited usage service contract provides a command and control backbone for a large integrated regional COMINT (communications intelligence) and jamming system.

The IRIDIUM system is a satellite-based, wireless personal communications network providing voice and data services to virtually anywhere on earth. The IRIDIUM system comprises three principal components: a satellite network, a ground network and IRIDIUM subscriber equipment. Voice and data messages are relayed between satellites 30 until they reach a satellite 30 above an IRIDIUM handset 40 or other subscriber equipment and the messages are then relayed back to earth.

The IRIDIUM constellation consists of 66 operational satellites 30 and seven spares orbiting in a constellation of six polar planes. Each plane has 11 mission satellites 30 performing as nodes in the network. This constellation ensures that every region of the earth is covered by at least one satellite at all times. The satellites 30 are in a near-polar orbit at an altitude of 485 miles (780 km). The satellites 30 circle the earth once every 100 minutes traveling at a rate of 16,832 miles per hour. Each satellite 30 is cross-linked to four other satellites 30; two satellites 30 in the same orbital plane and two in an adjacent plane.

The ground network is comprised of a System Control Segment (not shown) that supports and controls the satellites 30 and gateways 35 used to connect into a terrestrial telephone system or other communications networks (not shown). The primary linkage between the System Control Segment, the satellites 30, and the gateways 35 is through K-band feeder links and cross-links throughout the satellite constellation. Communications with subscriber units 40 from satellites 30 is via L-band.

Gateways 35 are the terrestrial infrastructure that provides telephone services, messaging, and support to the ground network operations. The key features of the gateways 35 are their support and management of mobile subscribers 40 and the interconnection of the IRIDIUM network to the terrestrial phone system.

IRIDIUM currently provides services to the United States DoD. The EMSS (Enhanced Mobile Satellite Services) supports low-rate voice and data services from mobile terminals. EMSS utilizes commercial services with a few modifications to allow for unique DoD features, such as end-to-end encryption and protection of sensitive user information. The DoD has a dedicated Government EMSS gateway in Wahiawa, Hi. for government use through the Defense Switched Network (DSN). Through this gateway, EMSS subscribers have direct connection into Defense Information Systems Network (DISN), which is capable of providing secure services, in addition to non-secure access to commercial telephone services. Commercially available user terminals support secure communications by adding removable National Security Agency (NSA) approved Type I Communications Security (COMSEC) sleeves onto the commercial user terminals.

Current limitations of using the IRIDIUM system include one channel for each pod, availability of only a 2400-bps data rate with future rates of 4800–9600 bps, and seconds of delay in obtaining and controlling the pod assets.

The IRIDIUM satellite system is described herein for use with the distributed electronic warfare system of the present invention. A similar satellite or other functionally similar communications system may also be used and be within the scope of the present invention.

The distributed electronic warfare system of the present invention is capable of search and collection in the electromagnetic spectrum from 2–2500 MHz, is capable of geolocation of signals in the electromagnetic spectrum from 2–2500 MHz, and is capable of electronic attack or jamming and spoofing of signals from 2–2500 MHz. The frequency range of 2–2500 MHz is exemplary and other frequency ranges may be covered. For example, the capabilities of the electronic warfare system of the present invention may be applied to microwave frequency range detections and jamming as well.

Figure 2:
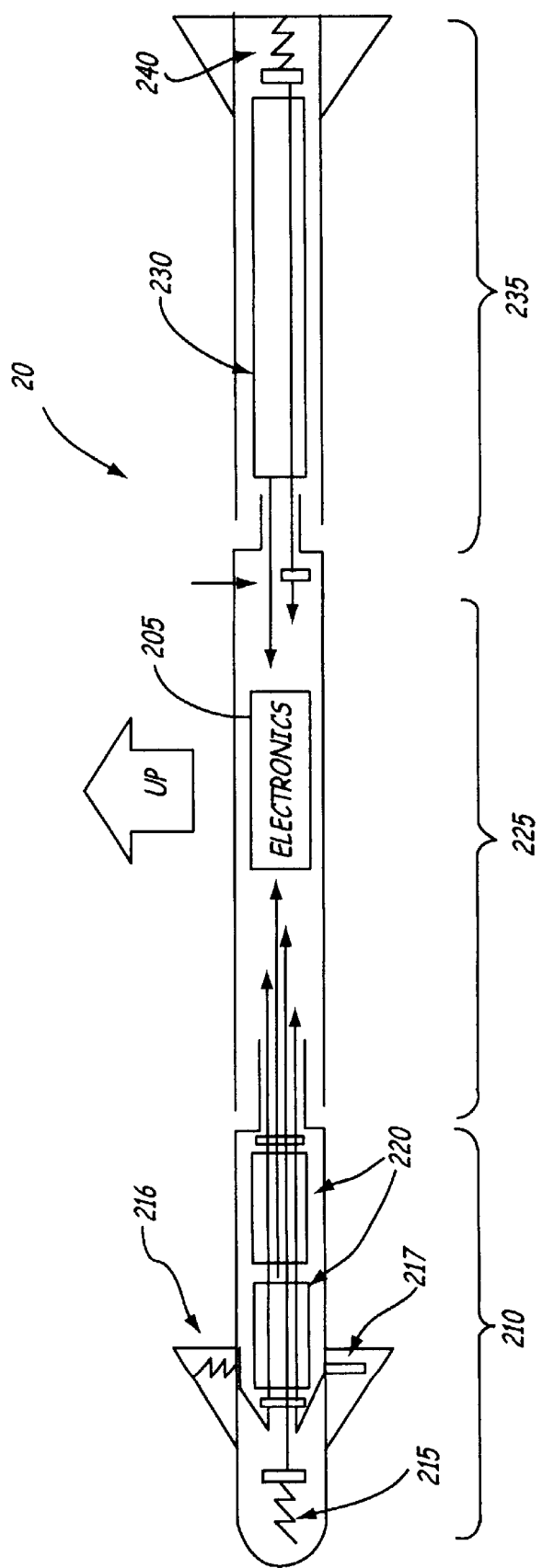
FIG. 2 is a diagram of an electronic warfare pod component of the present invention.

The aircraft 10 portions of the distributed electronic warfare system may be contained in an AIM-9 missile or similar pod 20, including all electronics 205 and antennas as shown in FIG. 2. Receive, transmit and digital signal processing equipment contained in the electronics package 205 can be easily packaged to fit within the 5-inch diameter body of the AIM-9 pod 20. Larger pod form factors could carry even more equipment, albeit at an aerodynamic and mission cost. Similarly, a smaller version perhaps a one-channel, one-antenna version of this pod concept may be packaged into a smaller pod such as a Hellfire missile body.

The pod 20 mounts on any standard hard point (not shown) on the aircraft 10. The pod 20 draws only primary power from the hard point. There is no control, input/output, or interaction with the aircraft systems or flight crew, requiring no attention, training, and involvement of the air crew. The flight crew can disable (for mission radio silence) or enable the pod 20 via primary power circuit breaker or other standard weapons arm circuit on board the aircraft 10. The pod 20 can be mounted on any coalition or allied aircraft without security risks due to the total isolation of the pod 20 systems from the aircraft 10.

Figure 3:
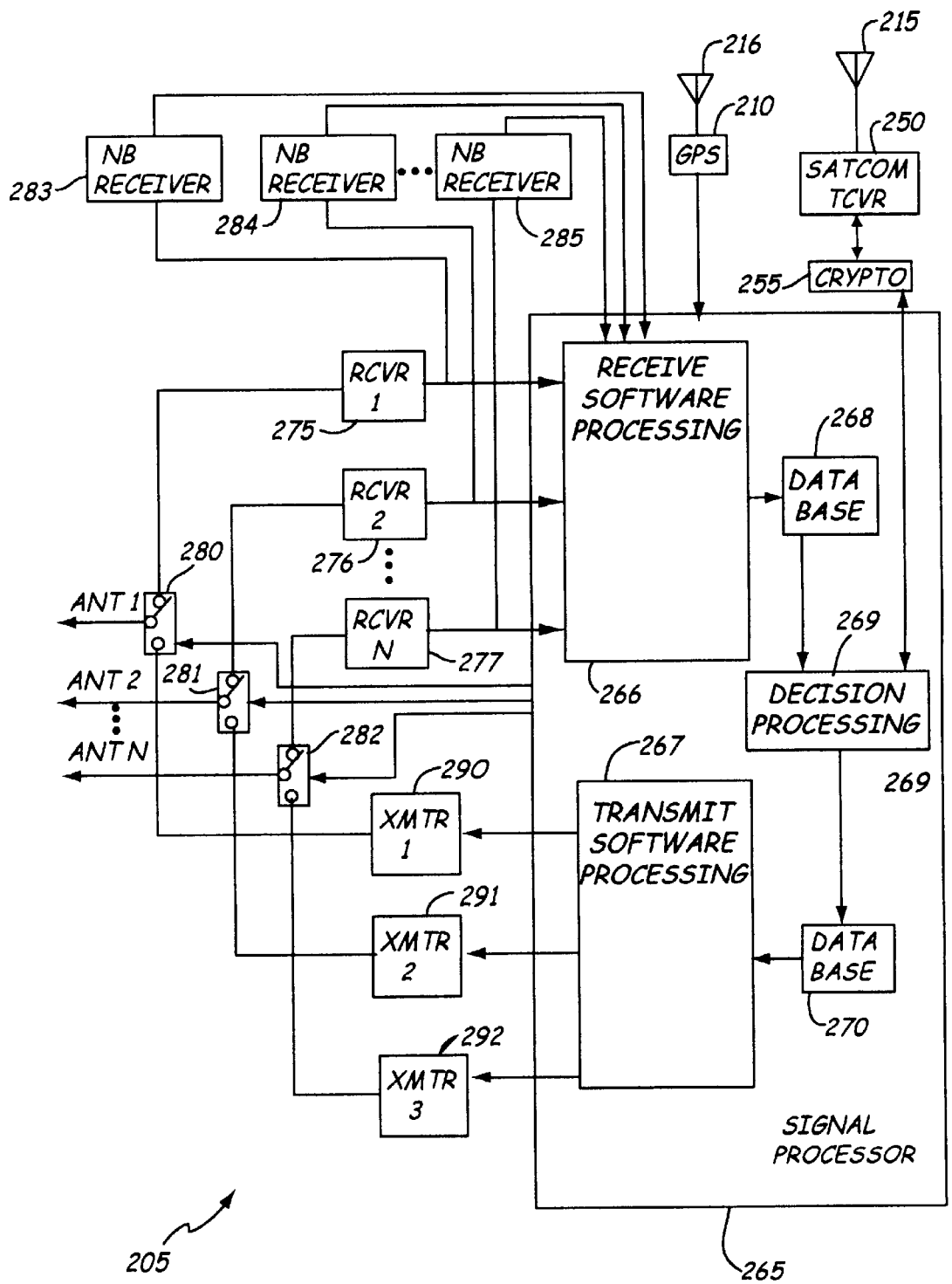
FIG. 3 is a block diagram of an electronics package contained in the electronic warfare pod of FIG. 2.

A block diagram of the electronics package 205 in pod 20 is shown in FIG. 3. The electronics package 205 contains an IRIDIUM L-band transceiver 250 connected to antenna 215 that provides both a datalink and control circuit to the central control site 25 through the IRIDIUM gateway 35 and associated telephone system. Each pod 20 uses one IRIDIUM channel. Each pod 20 contains a GPS receiver 260 connected to GPS antenna 216 to provide the pod's current location to the central control site 25. Encryption may be employed in all facets of operation as required through crypto unit 255.

The electronics package 205 includes a block of receivers 275–277 to cover the bands of interest for COMINT applications. The receivers 275–277 are connected to a signal processor 265 that performs signal processing of received signals using receive processing software 266. Analyzed signals may be stored in a database 268. A block of narrowband receivers 283–285 may be used to tune to specified channels to collect target signal. The outputs of the narrowband receivers 283–285 are also connected to the signal processor 265.

A block of transmitters 290–292 covering the bands of interest for jamming purposes may also be included in the electronics package 205. The transmitters 290–292 are controlled by the signal processor 265 through transmit software processing 267. A database 270 contains jamming waveforms or may be used to store a received waveform from receivers 275–277 for retransmission as a spoofing signal.

Transmit/receive switches 280–282 are used to switch antennas, described below, between receivers 275–277 and transmitters 290–292 for transmit and receive operation under control of the signal processor 265.

With an AIM-9 pod 20, 500–1000 watts of radiated transmitter power per channel, with three channels per pod, is feasible. Cooling of amplifiers contained in transmitters 290–292 is accomplished by airflow over the pod 20, with the amplifiers heat sunk to the pod body rather than the traditional heat sinks and fans. The maximum jammer power may well be limited by the available hard point and aircraft 10 primary power capacity, rather than the EW system and pod 20 constraints.

Figure 4:
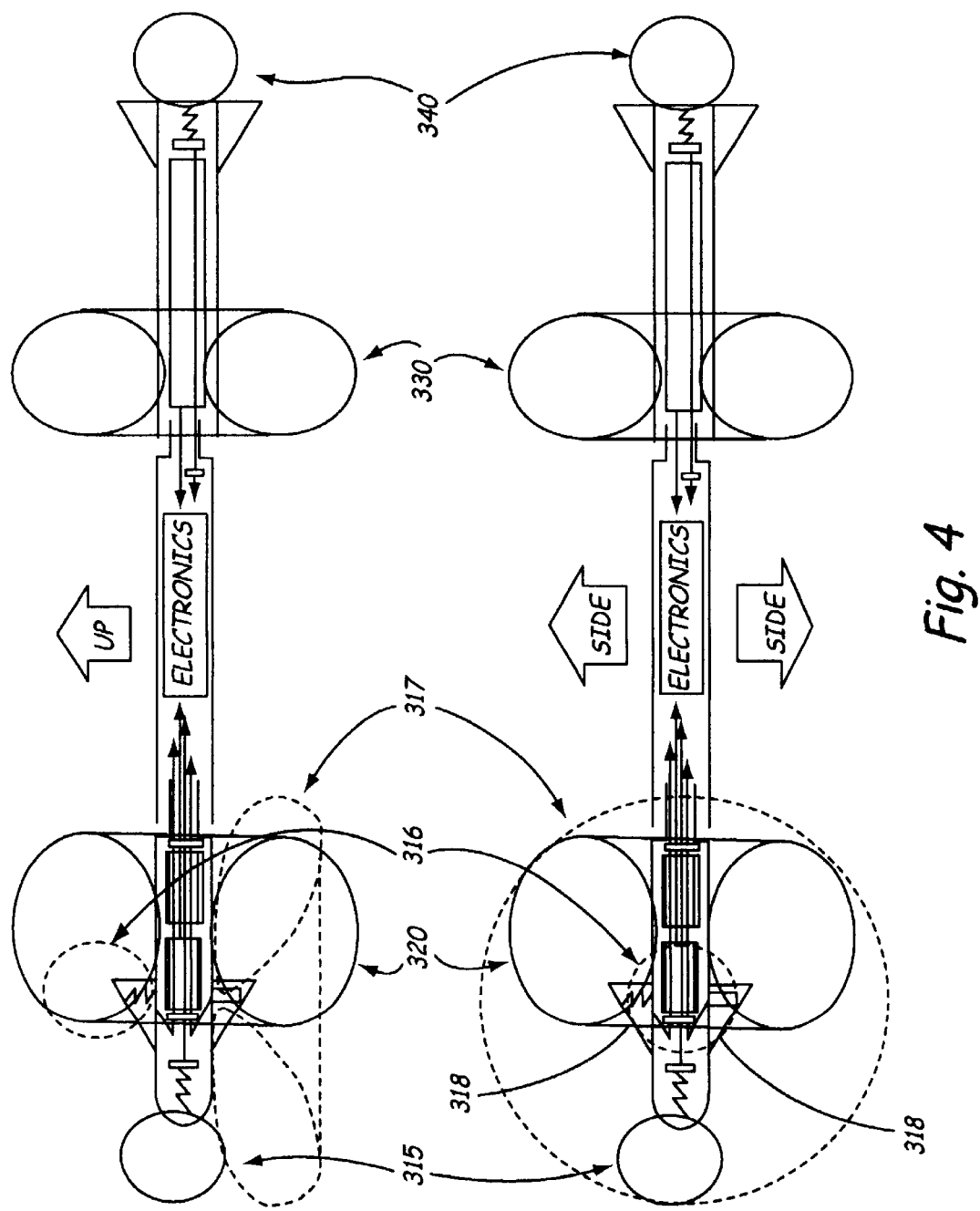
FIG. 4 is a diagram of the electronic warfare pod of FIG. 2 showing antenna radiation patterns.

To implement the capabilities of the distributed electronic warfare system of the present invention a novel antenna suite is utilized based upon the unique form factor of the AIM-9 pod 20. FIG. 2 shows the proposed antenna suite and FIG. 4 shows the radiation patterns of each antenna. The antenna configuration shown in FIG. 2 is typical and other configurations are possible.

A radio-transparent nose section 210 houses an IRIDIUM standard L-band helix antenna 215, looking forward with a cardioid pattern 315 in FIG. 4. Behind it is a center-fed sleeved dipole 220 for the UHF band with radiation pattern 320. A main metal body 225 of the AIM-9 pod 20 holds the electronics 205 and serves as a ground counterpoise for a VHF monopole 230, with radiation pattern 330. The VHF monopole 230 is located in a radio-transparent rear section 235 of the AIM-9 pod 20. At the very rear of the AIM-9 pod 200, mounted to and electrically isolated from the end of the VHF monopole 230, is an optional second rear-looking IRIDIUM helix antenna 240 with radiation pattern 340 to improve coverage. A forward upward-looking AIM-9 fin 216 is used as a GPS antenna for the pod's GPS receiver 210 in FIG. 4. A radiation pattern 316 for the GPS antenna 216 is shown in FIG. 4. A combination of a lower 217 and side fins 318 is used as a high-UHF pod antenna with radiation pattern 317.

All antennas are shared between receive and transmit. Antennas are by design omnidirectional, to the maximum extent of their canonical form (e.g. there will be pattern nulls off the ends of the dipoles and monopoles) and the aircraft structural shadowing (minimal but unavoidable).

Because of the omnidirectional pattern of the antennas, the IRIDIUM datalink, COMINT and jamming functions will work equally well in level, inverted and banked flight attitudes except in the direction of fuselage shadowing.

With the three VHF 230, UHF 220 and high UHF 217 antennas proposed, the pod 20 is capable of simultaneous COMINT and/or jamming in each of those bands. The VHF monopole 230 can prosecute combat net radios, land mobile, ATC, amateur radio bands, etc., as well as receive HF signals. The UHF dipole 220 can prosecute military UHF communications, land mobile, cellular and pagers, amateur radio bands, etc. The high UHF fin antenna 217 can prosecute GSM, cellular, INMARSAT, amateur radio bands, and military navigation and datalink systems.

It is possible to mount two pod systems 20 on an aircraft 10, one on each side for isolation purposes, and use them simultaneously with only limited interference due to the fuselage shadowing between them. This permits up to six simultaneous COMINT and jamming channels per aircraft, with no aircraft modifications, aircraft installation cost, aircrew training or workload.

If a COMINT-only capability is required for a mission, all of the aircraft 10 hard points could be loaded with pods with six to eight per aircraft, and all of the pods operated simultaneously via IRIDIUM from the central control site 25, resulting in a very capable wideband SIGINT aircraft temporarily and rapidly configured for a mission.

The distributed electronic warfare system of the present invention operates as discussed in the following paragraphs.

To perform search and collection of signals from targets 15, the bank of conventional wideband receivers 275–277 employing antennas 217, 220, and 230 in each pod 20 is utilized. The receivers 275–277 can instantaneously span any portion of the 2–2500 MHz band, depending upon cost and size constraints, and the revisit time as a function of target signal durations. The output of these receivers 275–277 is applied to the signal processor 265 in FIG. 3 that performs a fine, wideband fast Fourier transform (FFT) that is statistically blended into the search database 268 used for new energy detection and alarm. This is accomplished by comparing the content of each FFT bin to a long-term average, minimum, maximum, or standard deviation stored in the memory 268 to decide in decision processing block 269 in FIG. 3 if a new target signal or any signal is present or absent. The presence of new target signal data is reported to the central control site 25 via the IRIDIUM datalink.

The system can also be programmed to search specified channels in addition to bands. The receiver 275–277 outputs may also be applied in parallel to a 30 second (function of memory size) delay line (not shown) for comparison of a delayed search with a current real time search of a specified channel to detect a new signal. A bank of narrowband digital drop receivers 283–285 in FIG. 3 may be assigned to demodulate, identify, and collect any targeted signal on the specified channels from either the receivers' 275–277 outputs or database 268. Collection may be manually or automatically initiated. Any target signal data collected may be saved in the database 268 or sent to the central control site 25.

Each pod 20 is individually addressed by its IRIDIUM telephone number. Each pod 20 is programmed by the central control site 25 with search and collection instructions via the IRIDIUM datalink. Each pod 20 can be programmed independently, or as regional groups depending upon pod 20 location. When operating as groups, assumed here to be the normal mode of operation, all pods 20 in the group are programmed identically, and execute their commands in GPS time synchronization, which are 150 nanosecond resolution for C/A code and 15 nanoseconds for P/Y code. This is the basis for correlating the distributed signals at the central control site 25, and more importantly permits geolocation of any signal as described below. The random distribution of signals in three dimensions across the area of interest provides a very high probability of intercept.

Geolocation of targets 15 is determined by time difference of arrival of signals at a number of pods 20 simultaneously. Since all search operations and digitization are done with GPS time synchronization, including a digital radio memory (not shown) of 30 seconds (or whatever desired duration is implemented), geolocation can be easily accomplished by transmitting from each pod in a regional group, a short digital time-stamped sample file, with the GPS location of the aircraft at that instant to the central control site 25. A correlation program running on powerful computing resources at the central control site 25 determines the target 15 signal geolocation, in three dimensions if desired and if a sufficient number of pod samples is available, from the time difference of arrival of the signal at each of the dispersed pods. Decimating the sample file by bandlimiting to a single signal of interest lowers the amount of data to be transmitted back to about 1000 bps, well within the working IRIDIUM data rate of 2400 bps. Random location of target aircraft 15 in three-dimensions is desirable for the correlation process.

Electronic attack consists of transmitting a radio signal for the purpose of disrupting, denying or deceiving an enemy target 15. Electronic attack requires that a signal be transmitted on a selected frequency with a selected modulation. The present invention uses pod 20 transmitters 290–292 and antennas 217, 220, and 230 to generate, amplify and radiate signals under command of either the central control site 25 or in a control site-initiated autonomous reactive jamming mode. Positive command and control of the electronic warfare system is assured by a once-a-second or similar rate deadman command via the IRIDIUM link, as well as carrier lock of the IRIDIUM link. If a deadman command is missed, or if the pod 20 loses IRIDIUM downlink, the electronic attack system is immediately disabled. Operation resumes when both the link and deadman signal are reestablished. All conventional jamming modes may be used: reactive, blind, barrage, etc. Modulations may be from a preprogrammed waveform library, downloaded via the datalink, or played back from a prior pod recording. Deception is achieved by playing back a selected digital file from any of the same sources.

A distributed jamming system such as described here is without operational precedent. The system has the ability to mass more jamming power on a target 15 than is possible from a single jammer. The target 15 will realize the vector sum of all incident power from all independent sources. Simultaneous arrival of many independent, geographically distributed jamming signals negates the effectiveness of enemy anti-jam null steering receive antennas. The pods may be closer to the targets than otherwise possible, thereby reducing collateral damage from undesired jamming and being able to jam short duration signals because of the short time delay to/from the target versus the long delays from a standoff system.

It is believed that the distributed electronic warfare system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A distributed electronic warfare system comprising:
   a central control site for controlling the distributed electronic warfare system and for receiving target data from the system;
   a plurality of electronic warfare pods attached to a plurality of aircraft said electronic warfare pods for listening to targets and jamming the targets under control of the central control site and supplying the target data to the central control site; and
   a satellite communications system for communications between the electronic warfare pods and the central control site.

2. The distributed electronic warfare system of claim 1 wherein the satellite communications system further comprises:
   a satellite communications network comprising a plurality of satellites;
   a ground network that supports and controls the satellite communications network;
   gateways for communicating between the satellites and a telephone network; and
   satellite system transceivers installed in the electronic warfare pods for communicating with the control site over the satellite communications network.

3. The distributed electronic warfare system of claim 1 wherein each of the plurality of electronic warfare pods further comprises:
   a plurality of antennas for radiating jamming signals to the targets and receiving signals from the targets;
   a plurality of transmitters for generating the jamming signals;
   a plurality of receivers for receiving the signals from the targets; and
   a signal processor for processing the received signals from the targets and controlling the generation of the jamming signals.

4. The distributed electronic warfare system of claim 3 wherein the electronic warfare pod performs search and collection of signals from targets and said plurality of receivers instantaneously span portions of a band to receive new target signals; said signal processor performs a fast Fourier transform to detect new target signals; and wherein said presence of new target signals is reported to the central control site via the satellite communications system.

5. The distributed electronic warfare system of claim 4 wherein said system is programmed to search specified channels and said receiver outputs are applied in parallel to a delay line wherein the delay line output is compared to a current output of a specified channel to detect a new target signal.

6. The distributed electronic warfare system of claim 1 wherein each pod is programmed by the central control site with search and collection instructions via the satellite communications system.

7. The distributed electronic warfare system of claim 6 wherein each pod is programmed independently.

8. The distributed electronic warfare system of claim 6 wherein each pod is programmed to operate in groups and all pods in the group are programmed identically and execute their commands in GPS time synchronization.

9. The distributed electronic warfare system of claim 8 wherein geolocation of targets is determined by time difference of arrival of signals at a number of pods simultaneously said geolocation being performed by transmitting from each pod in the group a time-stamped sample file with a GPS location of each aircraft to the central control site wherein a correlation program determines the target signal geolocation from the time difference of arrival of the signals at each of the pods.

10. The distributed electronic warfare system of claim 3 wherein the pod performs electronic attack comprising transmitting a jamming signal to disrupt, deny or deceive an enemy target wherein the jamming signal is transmitted on a selected frequency with a selected modulation under command of one of the central control site and a control site-initiated autonomous reactive jamming mode.

11. The distributed electronic warfare system of claim 10 wherein positive command and control of the electronic warfare system is obtained by transmitting a deadman command via the satellite link and with carrier lock of the satellite link whereby the occurrence of one of the deadman command is missed and the satellite downlink signal is lost said electronic attack is disabled and operation resumed when the downlink signal and deadman command are reestablished.

12. The distributed electronic warfare system of claim 10 wherein jamming of the target comprise one of reactive, blind, and barrage jamming and modulations are from a preprogrammed waveform library downloaded via the satellite communications system or played back from a prior pod recording of the target and deception of a target is achieved by playing back a selected digital file from the same target.

13. A distributed electronic warfare system comprising a central control site for controlling and receiving data from the distributed electronic warfare system and a satellite communications system for communications in the distributed electronic warfare system said electronic warfare system further comprising:

a plurality of electronic warfare pods attached to a plurality of aircraft said electronic warfare pods for listening to signals from targets and jamming the targets under control of the central control site and for supplying the data to the central control site wherein each of said pods further comprise:

a plurality of antennas for radiating jamming signals to the targets and receiving signals from the targets;

a plurality of transmitters for generating the jamming signals;

a plurality of receivers for receiving the signals from the targets; and a signal processor for processing the received signals from the targets and controlling the generation of the jamming signals.

14. The distributed electronic warfare system of claim 13 wherein each of said electronic warfare pods performs search and collection of signals from the target s wherein said receivers instantaneously span a portion of a band and wherein said signal processor detects new energy and the presence of new energy is reported to the central control site via the satellite communications system.

15. The distributed electronic warfare system of claim 14 wherein said system is programmed to search specified channel s said pod further comprising a bank of narrowband receivers connected to the plurality of receivers to demodulate, identify, and collect any target signal on the specified channel wherein said collection is manually or automatically initiated and saved to a database or sent to the central control site.

16. The distributed electronic warfare system of claim 13 wherein each pod is programmed by the central control site with search and collection instructions via the satellite communications system.

17. The distributed electronic warfare system of claim 16 wherein each pod is programmed to operate in groups and all pods in the group are programmed identically and execute their commands in GPS time synchronization.

18. The distributed electronic warfare system of claim 17 wherein geolocation of targets is determined by time difference of arrival of signals at a number of pods simultaneously said geolocation being performed by transmitting from each pod in the group a time-stamped sample file with a GPS location of each aircraft to the central control site wherein a correlation program determines the target signal geolocation from the time difference of arrival of the signals at each of the pods.

19. The distributed electronic warfare system of claim 13 wherein the pod performs electronic attack against a target comprising transmitting a jamming signal wherein the jamming signal is transmitted on a selected frequency with a selected modulation under control of the central control site.

20. The distributed electronic warfare system of claim 19 wherein jamming of the target comprise one of reactive, blind, and barrage jamming and modulations are from a preprogrammed waveform library downloaded via the satellite communications system or played back from a prior pod recording of the target and deception of a target is achieved by playing back a selected digital file from the same target.

* * * * *